United States Patent [19]

Ziegler

[11] Patent Number: 4,539,850
[45] Date of Patent: Sep. 10, 1985

[54] PRESSURE OR PRESSURE-DIFFERENCE MEASURING APPARATUS WITH A PRESSURE SENSOR DEVICE PROTECTED AGAINST OVERLOAD

[75] Inventor: Horst Ziegler, Berlin, Fed. Rep. of Germany

[73] Assignee: Siemens Aktiengesellschaft, Munich, Fed. Rep. of Germany

[21] Appl. No.: 466,561

[22] Filed: Feb. 15, 1983

[30] Foreign Application Priority Data

Feb. 15, 1982 [DE] Fed. Rep. of Germany ....... 3205826
Jun. 11, 1982 [DE] Fed. Rep. of Germany ....... 3222620

[51] Int. Cl.³ .............................................. G01L 13/02
[52] U.S. Cl. ...................................... 73/706; 73/716; 73/720
[58] Field of Search ........................... 73/706, 716–722

[56] References Cited
U.S. PATENT DOCUMENTS

| | | | |
|---|---|---|---|
| 4,072,058 | 2/1978 | Whitehead | 73/706 |
| 4,218,925 | 8/1980 | DiDomizio | 73/716 |
| 4,329,877 | 5/1982 | Hershey | 73/706 |

FOREIGN PATENT DOCUMENTS

| | | |
|---|---|---|
| 2811442 | 9/1979 | Fed. Rep. of Germany . |
| 2657933 | 4/1980 | Fed. Rep. of Germany . |
| 3047276 | 9/1981 | Fed. Rep. of Germany . |

Primary Examiner—Donald O. Woodiel
Attorney, Agent, or Firm—Kenyon & Kenyon

[57] ABSTRACT

A pressure or pressure-difference measuring apparatus having a central pickup body and a pressure sensor device disposed within a measuring chamber, the sub-chambers of which are connected via connecting canals to antechambers formed between separating diaphragms and the central pickup body, is disclosed. The apparatus also has supplementary diaphragms resting against the pickup body and connected to the connecting canals through supplementary canals. A simplified mechanical design is accomplished by having single supplementary canals, each open to a connecting canal connected to a separating diaphragm, running to the supplementary diaphragm adjacent to the device's opposite separating diaphragm.

18 Claims, 4 Drawing Figures

PRESSURE OR PRESSURE-DIFFERENCE MEASURING APPARATUS WITH A PRESSURE SENSOR DEVICE PROTECTED AGAINST OVERLOAD

BACKGROUND OF THE INVENTION

This invention relates to pressure sensors in general and more particularly to a simplified mechanism for protecting pressure sensors from overload conditions. A pressure or pressure difference measuring apparatus having a central pickup body and a pressure sensor device protected against overload in a measuring chamber, the subchambers of which are connected by connecting canals to antechambers formed between separating diaphragms and the pickup body is described in U.S. Pat. No. 4,329,577. The apparatus also has supplementary diaphragms, resting against the pickup body with pre-tension and each arranged adjacent to a separating diaphragm, communicating therewith in a pressure-transmitting sense, and supplementary canals, running from the connecting canals to the supplementary diaphragms, each supplementary diaphragms being housed in a supplementary chamber filled with a filling liquid, the supplementary chambers being subdivided by the supplementary diaphagms into two subchambers, each of which is connected to a supplementary canal. The supplementary canals are arranged so that the supplementary canal leading to the adjacent side of the supplementary diaphragm and the supplementary canal leading to the nonadjacent side of the other supplementary diaphragm are connected to a connecting canal. Correspondingly, the other connecting canal is connected by two further supplementary canals to the respective other sides of the two supplementary diaphragms.

Another pressure or pressure-difference measuring apparatus, described in DE-A No. 26 57 933, contains an equalizing chamber, which is subdivided by an equalizing diaphragm, in the central pickup body. One subchamber of the equalizing chamber is connected to one antechamber of the apparatus and the other subchamber is connected to the other antechamber. The measuring chamber, housing the pressure sensor device of this apparatus, is connected by a connecting canal to the antechamber of a subchamber of the equalizing chamber and by a further connecting canal to the other antechamber or the other subchamber of the equalizing chamber. In this manner, a pressure or pressure-difference measuring apparatus is created which, due to the design of the equalizing diaphragm, forms a pressure equalizing path in the measuring chamber parallel to the pressure sensor device, whereby overloading of the pressure sensor device is prevented. The pressure sensor device in the known apparatus consists of a wall containing a semiconductor measuring diaphragm. Such pressure sensor devices are very sensitive to overload.

In another embodiment of a differential pressure measuring transducer, as described in DE-A No. 30 47 276, two canals are brought from the central pickup body into a separate structural unit, containing a pressure sensor device, arranged alongside the pickup body. This apparatus also utilizes a pressure sensor device consisting of a semiconductor sensor and protects against overloading by use of an equalizing chamber arranged parallel to the measuring chamber.

The known types of pressure or pressure-difference measuring apparatus have the disadvantage that their design is relatively complicated, since they require, in addition to a measuring chamber, a further equalizing chamber with a diaphragm, or supplementary chambers with supplementary diaphragms, which necessitates that either the pressure sensor unit is disposed in a supplemental structure provided next to the central pickup body, or that the connecting canal be brought out of the central pickup body and subsequently be brought back into the body.

It is an object of the present invention to provide an improved pressure or differential pressure measuring apparatus, having a central pickup body and a pressure sensor device protected against overload in a measuring chamber, which is distinguished by its relatively simple mechanical design.

Another object of the present invention is to provide an improved pressure or differential pressure measuring apparatus distinguished by its inexpensive production cost.

A further object of the present invention is to provide an improved pressure or differential pressure measuring apparatus distinguished over the prior art by its improved measuring characteristics.

SUMMARY OF THE INVENTION

These and other objects of the present invention are achieved in a pressure or differential pressure measuring apparatus of the type mentioned at the outset by having a single supplementary canal running to a supplementary diaphragm, which is adjacent to a separating diaphragm, from a connecting canal leading to the apparatus' other separating diaphragm.

It is a substantial advantage of the measuring apparatus according to the present invention that its design is simplified over the prior art in the field in requiring only a single supplementary canal for each connecting canal and in not requiring equalizing chambers having equalizing diaphragms. In the measuring apparatus according to the present invention, two supplementary diaphragms are disposed in the vicinity of the separating diaphragms in a manner providing for a pressure-transmitting connection between the separating diaphragm and the supplementary diaphragm instead of utilizing an equalizing chamber with an equalizing diaphragm.

Arranging the supplementary diaphragms in the vicinity of the separating diaphragms offers the further advantage of making it possible to accommodate the pressure sensor device, together with the measuring chamber accommodating it, in the central pickup body. The arrangement of the connecting and supplementary canals presents no difficulties because there is no equalizing chamber to be circumvented.

The measuring apparatus according to the present invention also presents a number of advantages relating to measurement techniques. One advantage is that temperature influences due to the spring stiffness of the equalizing diaphragm are not incurred. In addition, there is no longer a temperature influence on measurements due to changes in the separating diaphragm stiffness because of volume changes of filling the liquid. Furthermore, in the present invention, any pressure influence on the null point due to unequal housing chamber expansion in conjunction with the separating diaphragm stiffness, as exists in the case of the known types of apparatus, is eliminated. The pressure influence in the measuring range of pressure is still given only by the sensor and is therefore no longer dependent on changes of the separating diaphragm stiffness due to filling volume changes and on the change of the spring stiffness of the equalizing diaphragm due to an expansion of the housing. The error of the pressure characteristic is still dependent only on the pressure sensor device and the electronics connected thereto; nonlinear separating diaphragms and nonlinear equalizing diaphragms have no influence on this characteristic of the apparatus because the drive/displacement volume is very small if a semiconductor measuring sensor is used as the pressure sensor device, as is preferred. Finally, the alternating overload influence on the null point still depends, in the apparatus according to the present invention, on the hysteresis of the separating diaphragms, but not on the hysteresis of an equalizing diaphragm, the latter having been eliminated. The above-mentioned advantages are provided in the measuring device according to the present invention, because the supplementary diaphragms are inoperative and, therefore, have no influence on the measuring behavior during normal pressure conditions, and because the overall device has considerably smaller filling liquid spaces than that disclosed in the prior art.

In the pressure and differential pressure measuring apparatus according to the present invention, the supplementary diaphragms can be attached to the pickup body in the vicinity of the separating diaphragms in different ways. It is considered advantageous to dispose the supplementary diaphragms in supplementary chambers and to connect the supplementary chambers by auxiliary canals to the space adjoining the adjacent antechamber. This embodiment of the measuring apparatus according to the present invention has the advantage that the supplementary diaphragms can be designed largely independently of considerations of the adjacent separating diaphragm, and that the separating diaphragm and the supplementary diaphragm can be attached to the pickup body each for itself. Furthermore, because the supplementary diaphragms are disposed in individual supplementary chambers, compression springs may be added to these supplementary chambers to press the supplementary diaphragms against the pickup body with great force, if required.

In one embodiment of the present invention, the supplementary diaphragms are fastened to the pickup body within the antechambers. In this embodiment, the supplementary diaphragms must have a smaller diameter than the separating diaphragms and the connecting canal of each antechamber is led outside the region of the adjacent supplementary diaphragm to the measuring chamber and is open to the supplementary canal associated with the opposite antechamber which is led from the opposite supplementary diaphragm. The particular advantage of this embodiment is that it makes possible a particularly compact design, and, in addition, allows simple fabrication because only a single diaphragm bed needs to be provided on the central pickup body for each separating diaphragm and the adjacent supplementary diaphragm.

Regardless of the mechanical design of the pressure or pressure-difference measuring apparatus according to the present invention, the supplementary diaphragms have a pre-tension such that they are lifted off the pickup body only if a predetermined differential pressure is exceeded at the pressure sensor device. The predetermined differential pressure is a pressure which is above the nominal value of the differential pressure.

According to a further embodiment of the present invention, the pre-tension of the supplementary diaphragms can advantageously be obtained by providing castings disposed between the pickup body and the supplementary diaphragms formed by a liquid introduced and solidified under "overpressure" between the pickup body and the supplementary diaphragm. Because the liquid is introduced under "overpressure", i.e., a pressure above the nominal value, and allowed to solidify under this pressure, the supplementary diaphragm is given a pre-tension such that it exerts no influence on the measuring behavior in the range of the nominal pressure. If the "overpressure" is chosen so that it corresponds to the pressure at which the respective diaphragm is to lift off, the supplementary diaphragms execute no lifting motion in the proper measuring range, and take up the displacement volume from the non-adjacent separating diaphragm in the over pressure range.

It is a further advantage of this embodiment of the present invention that, because the diaphragm beds were formed with the aid of castings, the supplementary diaphragms rest on the bed without a void and support the respective adjacent separating diaphragm mechanically without permanent deformation.

The liquid utilized in the formation of said castings is preferably comprised of a metal melt of a metal melting at low temperature, such as tin, though other solidifying substances can be considered as liquids also.

In order to prevent the casting from sticking to the supplementary diaphragm, and to further prevent the liquid from flowing off through a connecting canal to the opposite separating diaphragm, a thin sealing diaphragm, attached to the pickup body within the supplementary diaphragm, is advantageously disposed between each casting and the associated supplementary diaphragm.

A further embodiment of the present invention comprises a pressure or differential pressure measuring device having supplementary diaphragms having a rough surface on the side facing the adjacent sealing diaphragm. The rough surface of the supplementary diaphragm facilitates the lifting from the sealing diaphragm if there is "overpressure".

While a method for making a diaphragm bed for a diaphragm subjected to pressure in which a body associated with the diaphragm is provided, on its side associated with the diaphragm, with a recess which is closed off toward the diaphragm by a thin wall and filled with a hardenable medium is described in DE-OS No. 28 11 442, only a diaphragm bed of great precision is made there by pressure on the diaphragm directed toward the body, so that the diaphragm can come to rest against the diaphragm bed in the case of an overload without suffering deformations.

DETAILED DESCRIPTION

Figure 1:
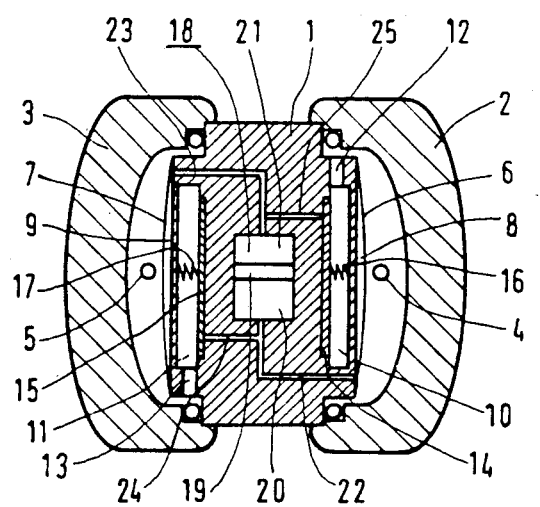
FIG. 1 is a first embodiment of a differential pressure measuring apparatus in accordance with the present invention, having supplementary diaphragms disposed in supplementary chambers.

With reference now to the drawings, FIG. 1 shows an embodiment of a differential pressure measuring apparatus having a central pickup body 1 which is closed off on both sides, for instance, by caps 2 and 3. The caps 2 and 3 have inflow openings 4 and 5, through which the measuring device is acted upon by the pressure difference to be measured. The central pickup body 1 is provided on both sides with separating diaphragms 6 and 7 which are disposed on opposite sides of the pickup body 1 where the pickup body is shaped as a diaphragm bed, the area between the separating diaphragms 6 and 7 and the pickup body 1 defining antechambers 8 and 9, respectively. The pickup body 1 is provided with supplementary chambers 10 and 11 which are connected by auxiliary canals 12 and 13 to the interior of the caps 2 and 3, whereby a pressure-transmitting connection between the supplementary chambers 10 and 11 and the separating diaphragms 6 and 7, respectively, is formed. In each of the supplementary chambers 10 and 11, a supplementary diaphragm 14 and 15, respectively, is provided which is pushed by compression springs 16 and 17, respectively, against the pickup body 1. The compression springs 16 and 17 can be eliminated if supplementary diaphragms with sufficient pre-tension are used.

The pickup body 1 is further provided with a measuring chamber 18, which is subdivided by a pressure sensor device 19, indicated only schematically in the figure, into a subchamber 20 and a further subchamber 21. The pressure sensor device 19 preferably comprises a wafer with a semiconductor measuring diaphragm. The subchamber 20 of the measuring chamber 18 is connected by a connecting canal 22 to the antechamber 8, while the other subchamber 21 is in communication with the antechamber 9 through a further connecting canal 23. The connecting canal 22 is further brought via a supplementary canal 24 to the supplementary diaphragm 15 disposed on the side of the pickup body containing antechamber 9; correspondingly, the connecting canal 23 is connected to the supplementary diaphragm 14 via a supplementary canal 25. The apparatus' antechambers 8 and 9, connecting canals 22 and 23, supplementary canals 24 and 25 and measuring chamber 18 are fluid filled to provide for the communicating of differential pressure sensed at the separating diaphragms 7 and 8.

The embodiment of the pressure-difference measuring apparatus in accordance with the present invention as shown in FIG. 1 operates as follows:

If the device is subjected to a pressure difference below or in the range of the nominal value of the differential pressure, then this differential pressure is communicated through the connecting canals 22 and 23 and subchambers 20 and 21 to the pressure sensor device 19 which then derives a corresponding electrical signal to be transmitted. The supplementary diaphragms 14 and 15 are uneffected because of the pre-tension acting on them. If the pressure difference exceeds the nominal value of the pressure difference by a predetermined value due to an overload, the separating diaphragm 7, for instance, will, under the proper pressure conditions, push out the pressure-transmitting liquid which is located under it in the antechamber 9. The expelled liquid travels through the connecting canal 23 and the supplementary canal 25 to the supplementary diaphragm 14 and forces the latter to lift off. An overloading of the pressure sensor device 19, exceeding the magnitude permissible for the pressure sensor device, is thereby avoided.

The measuring apparatus acts similarly if, due to the given overpressure conditions, the separating diaphragm 6 pushes the liquid contained in its antechamber 8 out through the connecting canal 22 and the supplementary canal 24, because this liquid then makes the supplemental diaphragm 15 lift off.

Figure 2:
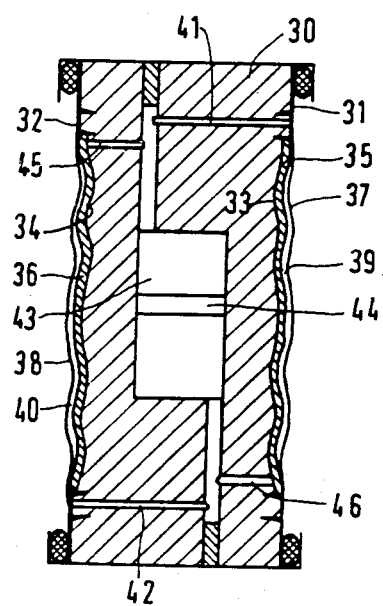
FIG. 2 is a second embodiment of the differential pressure measuring apparatus having supplementary diaphragms accommodated within the antechambers.

In another embodiment of the pressure or pressure difference apparatus according to FIG. 2, in which only the essential parts in connection with the invention are shown, a central pickup body 30 is designed so that its end faces 31 and 32, form diaphragm beds 33 and 34, respectively. Supplementary diaphragms 35 and 36 are welded to the pickup body 30 at the two end faces 31 and 32, respectively, and each have a pre-tension such that they are pressed against the respective diaphragm bed 33 and 34, respectively. Separating diaphragms 37 and 38, forming, together with the pickup body 30 and the supplementary diaphragms 35 and 36 resting thereon, respective antechambers 39 and 40, are also attached to end faces 31 and 32, respectively, of the pickup body 30. The diameter of the supplementary diaphragms 35 and 36 is made smaller than that of the separating diaphragms 37 and 38. The apparatus' antechambers 39 and 40, connecting canals 41 and 42, supplementary canals 45 and 46 and measuring chamber 43 are fluid filled to provide for the communication of differential pressure sensed at the separating diaphragms 37 and 38.

The chosen design and attachment of the separating diaphragms and the supplementary diaphragms makes it possible to provide, outside the region of the supplementary diaphragms 35 and 36, the connecting canals 41 and 42, through which the antechambers 39 and 40, are connected to the measuring chamber 43 disposed in the interior of the pickup body 30. A pressure sensor device 44 is disposed within the measuring chamber 43 and is also shown only schematically in FIG. 2.

A supplementary canal 45 leads from the connecting canal 41 to the supplementary diaphragm 36 and, correspondingly, a further supplementary canal 46 is provided between the connecting canal 42 and the supplementary diaphragm 35.

The pressure-difference measuring apparatus according to FIG. 2 operates quite similarly to that according to FIG. 1. As with the embodiment of the pressure difference measuring apparatus according to FIG. 1, the apparatus depicted in FIG. 2 has supplementary diaphragms 35 and 36 having no influence of any kind on the measuring behavior of the apparatus for pressure differences which are within the range of the nominal value of differential pressures, because the supplementary diaphragms 35 and 36 are pressed under these operating conditions firmly against the pickup body 30. If, however, the pressure difference exceeds a predetermined value which is above the nominal value of the differential pressure, then either the supplemental diaphragm 36 is lifted off due to pressure on the separating diaphragm 37 transferred via the supplementary canal 45 or the supplementary diaphragm 35 is lifted off due to pressure on the separating diaphragm 38 transferred via the supplementary canal 46. In any case, the liquid which is pressed out of the antechambers by the separating diaphragms in the event of an overload is taken up by a supplementary diaphragm, and, thereby, a dangerous overload of the pressure sensor device 44 is avoided.

Figure 3:
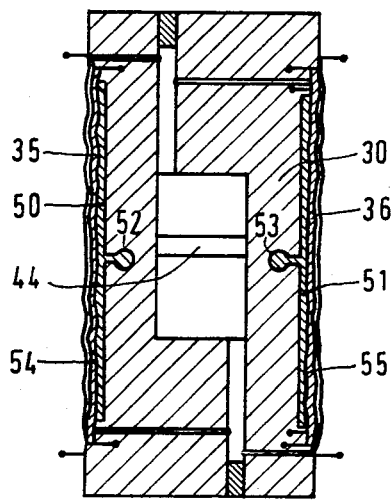
FIG. 3 is an additional embodiment of the pressure-difference measuring apparatus having castings.
Figure 4:
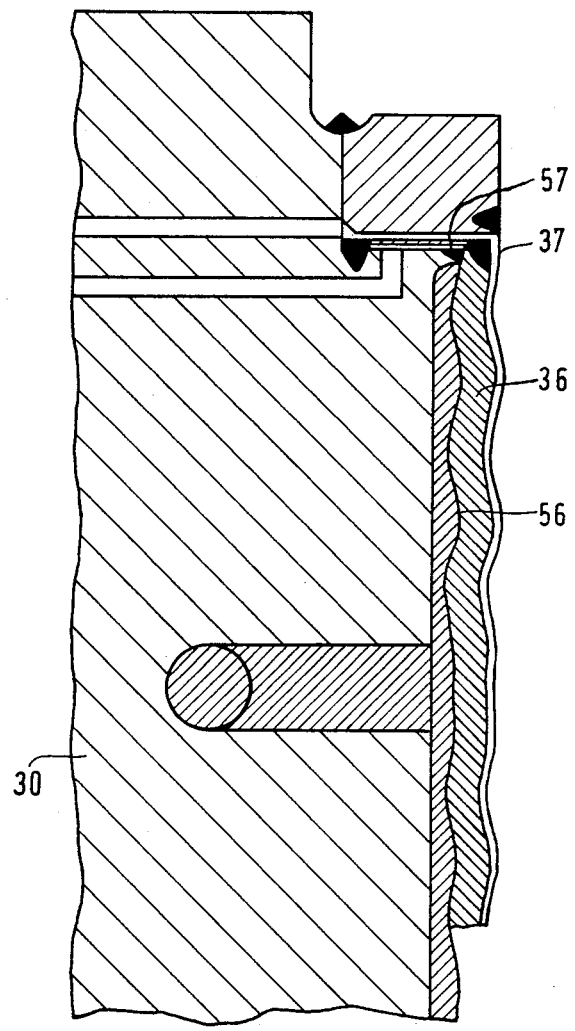
FIG. 4 is an enlarged portion taken from FIG. 3 including a sealing diaphragm and detailing diaphragm placement and welding.

The embodiment of the present invention according to FIGS. 3 and 4 differs from that according to FIG. 2 in than on both sides of the pickup body 30, castings 50 and 51 are provided which are formed by a solidifying liquid. The liquid is pressed through inlet canals 52 and 53, respectively, into spaces 54 and 55, disposed between the pickup body 30 and the supplementary diaphragms 35 and 36, respectively, at a pressure which corresponds to the pressure at which the supplementary diaphragms are to lift off for relieving the pressure sensor device 44 of any overload. This pressure is maintained until the liquid is solidified to form the castings 50 and 51. By applying pressures of different magnitudes on the liquid on the high-pressure and the low-pressure side, solder and cement joints can be secured against dangerous tensile stresses.

As may be seen from FIG. 4, a thin sealing diaphragm 56 is attached at the pickup body 30 within each supplementary diaphragm 35 and 36 by a circular welded seam 57. The supplementary diaphragm 36 has a rough surface on its side facing the sealing diaphragm 56.

For the sake of better clarity, throttling devices, which precede the measuring chamber on both sides, are not shown in FIGS. 1 to 4. In a pressure measuring apparatus design, a separating diaphragm and a supplementary diaphragm opposite it are provided only on the material measurement side.

What is claimed is:

1. A differential pressure measuring apparatus comprising:
   a central pickup body;
   a measuring chamber, having a first and second subchamber;
   a pressure sensor device disposed in said measuring chamber;
   first and second separating diaphragms attached to said central pickup body and forming first and second antechambers between said first and second separating diaphragms and said central pickup body;
   first and second connecting canals connecting said first and second subchambers to said first and second antechambers;
   first and second supplementary diaphragms resting against the central pickup body with pre-tension, said first and second supplementary diaphragms being disposed in said first and second antechambers adjacent said first and second separating diaphragms, respectively, said supplementary diaphragms each being fastened to the central pickup body within the respective one of said antechambers; and
   first and second single supplementary canals connecting said first and second connecting canals respectively to sides of said second and first supplementary diaphragms, opposite said second and frist separating diaphragms.

2. The apparatus recited in claim 1 and further including castings disposed between the central pickup body and the supplementary diaphragms, against which said supplementary diaphragms are stressed in tension.

3. The apparatus recited in claim 2, wherein said castings are made of a metal having a low melting temperature.

4. The apparatus recited in claim 2 and further including a thin sealing diaphragm disposed between each casting and the associated supplementary diaphragm and attached to the pickup body within the supplementary diaphragms.

5. The apparatus recited in claim 4, wherein said supplementary diaphragms have a rough surface facing the adjacent sealing diaphragms.

6. A differential pressure measuring apparatus comprising:
   a central pickup body;
   a measuring chamber, having a first and second subchamber;
   a pressure sensor device disposed in said measuring chamber;
   first and second separating diaphragms attached to said central pickup body and forming first and second antechambers between said first and second separating diaphragms and said central pickup body;
   first and second connecting canals connecting said first and second subchambers to said first and second antechambers, respectively;
   first and second supplementary chambers disposed in said central pickup body adjacent said first and second antechambers, respectively;
   first and second supplementary diaphragms resting against the central pickup body with pre-tension, said first and second supplementary diaphragms being disposed in said first and second supplementary chambers, respectively;
   first and second single supplementary canals connecting respectively said first and second connecting canals to sides of said second and first supplementary diaphragms opposite said second and first antechambers, respectively; and
   first and second auxiliary canals connecting respectively said first and second supplementary chambers to spaces adjacent said first and second separating diaphragms on sides thereof opposite said first and second antechambers, respectively.

7. The apparatus recited in claim 6 and further including first and second compression springs disposed in said first and second supplementary chambers, pressing said first and second supplementary diaphragms against the central pickup body to establish said pretension.

8. The apparatus recited in claim 1 or 6, wherein said pressure sensor device and said measuring chamber are contained in said central pickup body.

9. The apparatus recited in claim 1 or 6, wherein said supplementary canals and said connecting canals are contained in said central pickup body.

10. A method of constructing a differential pressure measuring apparatus comprisings the steps of:
    disposing a pressure sensor device in a measuring chamber, having a first and second subchamber;
    attaching first and second separating diaphragms to a central pickup body to form first and second antechambers between said first and second separating diaphragms and said central pickup body;
    connecting said first and second subchambers to said first and second antechambers with first and second connecting canals;
    disposing first and second supplementary diaphragms against said central pickup body, the steps of attaching said separating diaphragms and disposing said supplementary diaphragms being performed so that said first and second supplementary diaphragms are located in said first and second antechambers adjacent said first and second separating diaphragms, respectively;

fastening said supplementary diaphragms to said central pickup body within the respective ones of said antechambers;

pretensioning said first and second supplementary diaphragms against the central pickup body; and connecting said first and second connecting canals respectively to sides of said second and first supplementary diaphragms opposite said second and first separating diaphragms with single first and second supplementary canals.

11. The method recited in claim 10, comprising pretensioning said supplementary diaphragms by introducing and maintaining a solidifying liquid under pressure between the pickup body and the supplementary diaphragms and allowing said liquid to solidify to form castings between said pickup body and said supplementary diaphragms.

12. The method recited in claim 11 wherein said pressure of said solidifying liquid corresponds approximately to the pressure at which each supplemental diaphragm is lifted off.

13. The method recited in claim 11, wherein said solidifying liquid is a metal having a low melting temperature.

14. The method recited in claim 11 and further including:

placing a thin sealing diaphragm between each casting and the associated supplementary diaphragm and attaching said sealing diaphragm to the pickup body within the supplementary diaphragms.

15. A method of constructing a differential pressure measuring apparatus comprising:

disposing a pressure sensor device in a measuring chamber, having a first and second subchamber, attaching first and second separating diaphragms to a central pickup body to form first and second antechambers between said first and second separating diaphragms and said central pickup body;

connecting said first and second subchambers to said first and second antechambers with first and second connecting canals, respectively;

disposing first and second supplementary diaphragms against said central pickup body in first and second supplementary chambers located adjacent said first and second antechambers, respectively;

connecting, by a first and a second auxiliary canal, said first and second supplementary chambers to respective spaces located adjacent said first and second separating diaphragms opposite said first and second antechambers, respectively;

pretensioning said first and second supplementary diaphragms against the central pickup body; and connecting said first and second connecting canals respectively to sides of said second and first supplementary diaphragms opposite said second and first antechambers with single first and second supplementary canals.

16. The method recited in claim 15 and further including: disposing first and second compression springs in said first and second supplementary chambers to press said first and second supplementary diaphragms against the central pickup body.

17. The method recited in claim 11 or 15, comprising pretensioning said supplementary diaphragms to provide a pre-tension such that said supplementary diaphragms are lifted from the pickup body only if a predetermined differential pressure at the pressure sensor device is exceeded.

18. The method recited in claim 11 or 15 and further including:

placing the pressure sensor device and the measuring chamber in the central pickup body.

* * * * *